United States Patent
Homner et al.

(10) Patent No.: US 8,829,353 B2
(45) Date of Patent: Sep. 9, 2014

(54) CABLE-SUPPORT ARRANGEMENT

(71) Applicant: S-Fasteners GmbH, Althengstatt (DE)

(72) Inventors: Bernhard Homner, Calw-Stammheim (DE); Dimitri Svyrsky, Pforzheim (UA)

(73) Assignee: S-Fasteners GmbH, Althengstett (DE)

( * ) Notice: Subject to any disclaimer, the term of this patent is extended or adjusted under 35 U.S.C. 154(b) by 0 days.

(21) Appl. No.: 13/961,131

(22) Filed: Aug. 7, 2013

(65) Prior Publication Data

US 2014/0048308 A1    Feb. 20, 2014

(30) Foreign Application Priority Data

Aug. 20, 2012   (DE) .......................... 20 2012 007 989

(51) Int. Cl.
*H01B 17/14*    (2006.01)
*H02G 3/32*    (2006.01)

(52) U.S. Cl.
CPC . *H01B 17/14* (2013.01); *H02G 3/32* (2013.01)
USPC .................. 174/161 R; 174/158 R; 174/68.1; 248/65; 248/74.1; 248/68.1

(58) Field of Classification Search
CPC ............. H02G 3/00; H02G 3/32; H02G 3/30; H02G 3/36; H02G 3/28; H02G 3/26; H02G 3/04; H02G 3/22; H02G 7/12; H01B 17/14; H01B 17/16
USPC ..... 174/68.1, 68.3, 72 A, 135, 40 CC, 158 R, 174/137 R; 248/68.1, 74.3, 65, 74.1, 74.2, 248/74.4; 361/825, 826; 385/134, 135
See application file for complete search history.

(56) References Cited

U.S. PATENT DOCUMENTS

| | | | | |
|---|---|---|---|---|
| 5,899,418 A | * | 5/1999 | Khokhar | 248/74.3 |
| 5,941,483 A | * | 8/1999 | Baginski | 248/68.1 |
| 5,992,802 A | * | 11/1999 | Campbell | 248/68.1 |
| 6,732,982 B1 | | 5/2004 | Messinger | |
| 6,880,788 B2 | * | 4/2005 | Stephen | 248/68.1 |
| 7,527,226 B2 | * | 5/2009 | Kusuda et al. | 248/68.1 |
| 8,191,836 B2 | * | 6/2012 | Korczak | 248/68.1 |
| 8,353,485 B2 | * | 1/2013 | Hjerpe | 248/68.1 |
| 8,757,560 B2 | * | 6/2014 | Darnell | 174/68.1 |
| 2004/0150978 A1 | | 8/2004 | Jelinger | |
| 2004/0206855 A1 | | 10/2004 | Caveney et al. | |
| 2007/0246616 A1 | | 10/2007 | Budagher | |

FOREIGN PATENT DOCUMENTS

| | | |
|---|---|---|
| EP | 2045475 A2 | 4/2009 |
| EP | 1772935 B1 | 6/2012 |
| EP | 2485352 A1 | 8/2012 |
| GB | 2367695 A | 4/2002 |

* cited by examiner

*Primary Examiner* — Angel R Estrada
(74) *Attorney, Agent, or Firm* — Woodling, Krost and Rust (57) ABSTRACT

Cable-support arrangement with cable-supporting units 3, 5, which can be arranged above one another. The cable-supporting units can be aligned to different rotation positions with reference to axis A. The cable-support arrangement 1, comprises at least one cable-supporting unit consisting of a base part 3B, 5B and at least one cable support 3K1, 3K2, 5K1, permanently attached to this base part, a stand part 2, optional spacers 4, and a securing pin 6, common to the base part, the stand part and the spacer. These superimposed units (stand part, base part and spacer) are connected by a detachable and lockable plug-in connector 7. In their unlocked position, the superimposed units can be rotated in relation to one another around the axis A and positioned in a selectable axis-related rotation locking position.

14 Claims, 10 Drawing Sheets

FIG. 7

CABLE-SUPPORT ARRANGEMENT

This application claims priority to German Utility Model DE 20 2012 007 989.1, filed Aug. 20, 2012. German Utility Model DE 202012 007 989.1, is incorporated herein in its entirety by reference hereto.

FIELD OF THE INVENTION

The invention concerns a cable-support arrangement with various cable-supporting units superimposed on one another.

BACKGROUND OF THE INVENTION

The patent application GB 2 367 695, A describes a cable-support arrangement with cable supports superimposed on one another. All the cable supports are arranged on a common pin and are held together by nuts screwed onto either end of the pin. A cable support consists of two superimposed halves, between which the cables are located. A rotating engaging arrangement permits the two halves to be rotated around the axis of the pin in order to gain access to the cables.

The patent application US 2004/0150978, A1, describes a cable-support arrangement where the cables are arranged mainly on top of one another between two adjacent prong-like elements of a cable support. Each cable support is joined to the same base plate and can be turned by means of a rotating and engaging arrangement.

The European patent EP 1 772 935, B1, describes a cable-support arrangement comprising a base part and a plug-in connector arrangement with spring arms. The cable support is located on the plug-in connector, whose spring arms are inserted into a recess in the base part. It can be turned and fixed in an engagement position. The engaging connection takes place between the engaging elements on the spring arm and various engaging positions on the inner wall of the recess. Interlocking engaging grooves running parallel to the rotation axis of the plug-in connector are provided for this purpose.

SUMMARY OF THE INVENTION

The purpose of the invention is to provide a tower-like cable-support arrangement by means of which the cable supports are arranged at different heights above a base plate or similar device, and can be aligned in different directions as required.

Embodiments of the invention are shown in the drawings and are described in more detail below.

DESCRIPTION OF THE INVENTION

Figure 1:
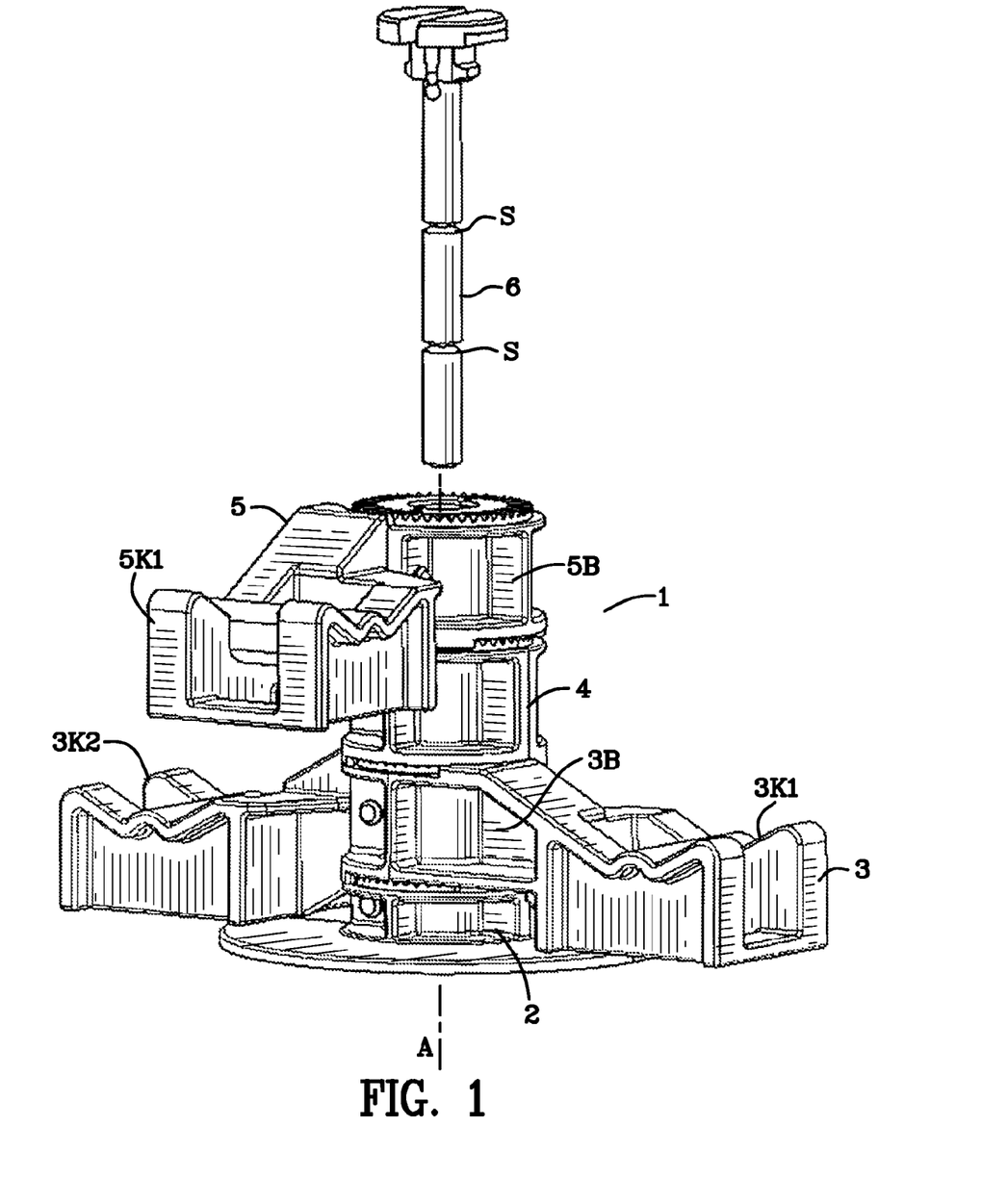
FIG. 1 shows an isometric diagram of the cable-support arrangement in accordance with the invention, with a stand part, cable-supporting units, a spacer and a securing pin to be inserted from the uppermost cable-supporting unit.

FIG. 1 shows an isometric diagram of a cable-support arrangement 1 in accordance with the invention, with a stand part 2, cable-supporting units 3 and 5, a spacer 4 and a securing pin 6 to be inserted into the cable-support arrangement from the uppermost cable-supporting unit.

The stand part 2 can be attached to a floor, wall or ceiling plate etc. e.g. by bonding.

The cable-support arrangement has a tower-like construction, where the individual elements can be superimposed on one another as required. In the diagram shown in FIG. 1, the stand part 2 is followed by the cable-supporting unit 3, above which the spacer 4 and the next cable-supporting unit 5 are arranged. The cable-support arrangement 1 is assembled in the following order: The cable-supporting unit 3 is placed on the stand part 2. Both parts 3 and 2 are joined by means of a detachable plug-in connection (details of which will be given later). The spacer 4 is then placed on the cable-supporting unit 3. These two parts 3 and 4 are also joined by means of a detachable plug-in connection. Finally the cable-supporting unit 5 is placed on the spacer 4, and the cable-supporting unit 5 and the spacer 4 are also joined to one another by means of a detachable plug-in connection.

Figure 2B:
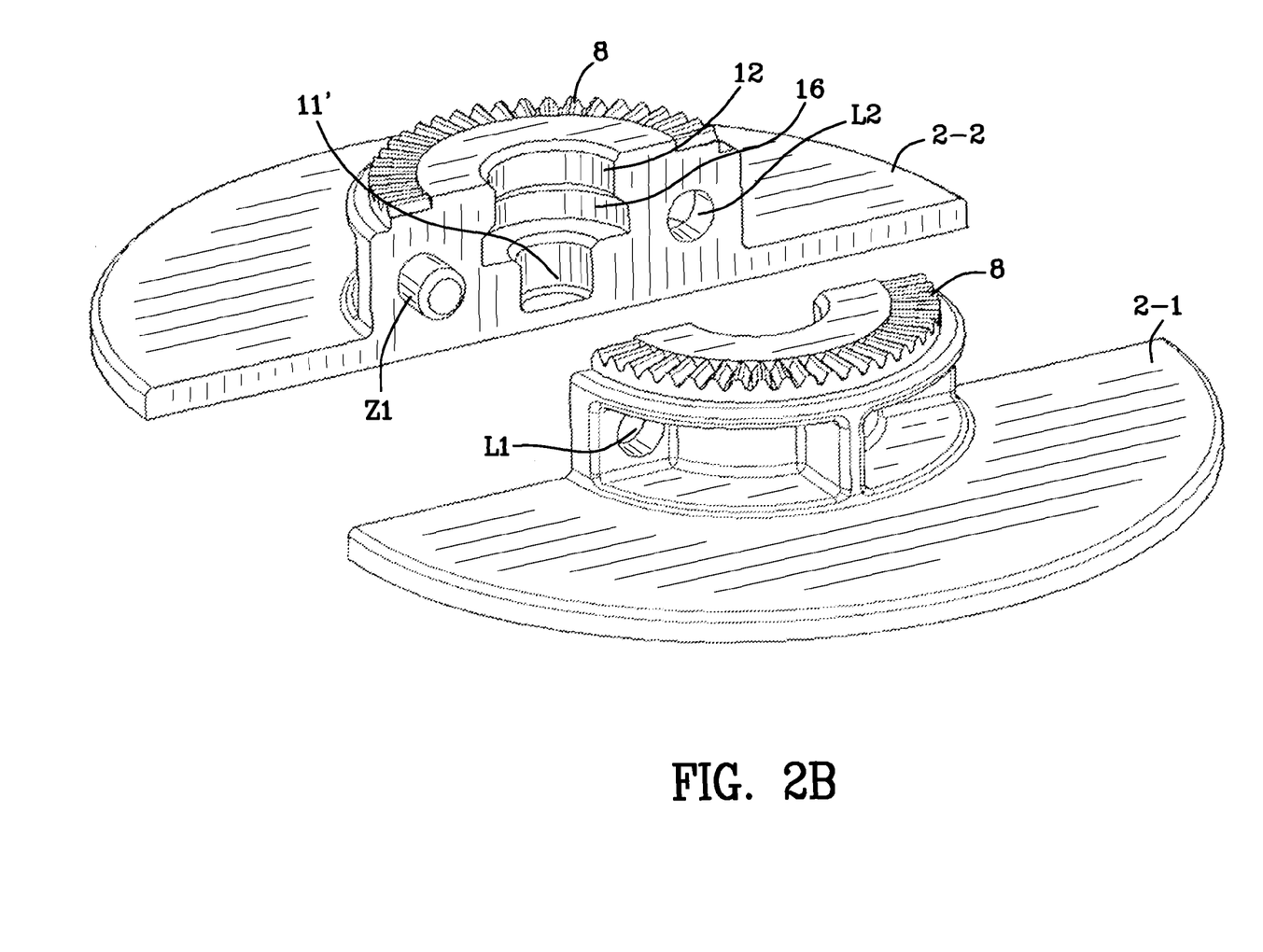
FIG. 2B shows an isometric diagram of the existing stand part consisting of two identical halves.
Figure 3A:
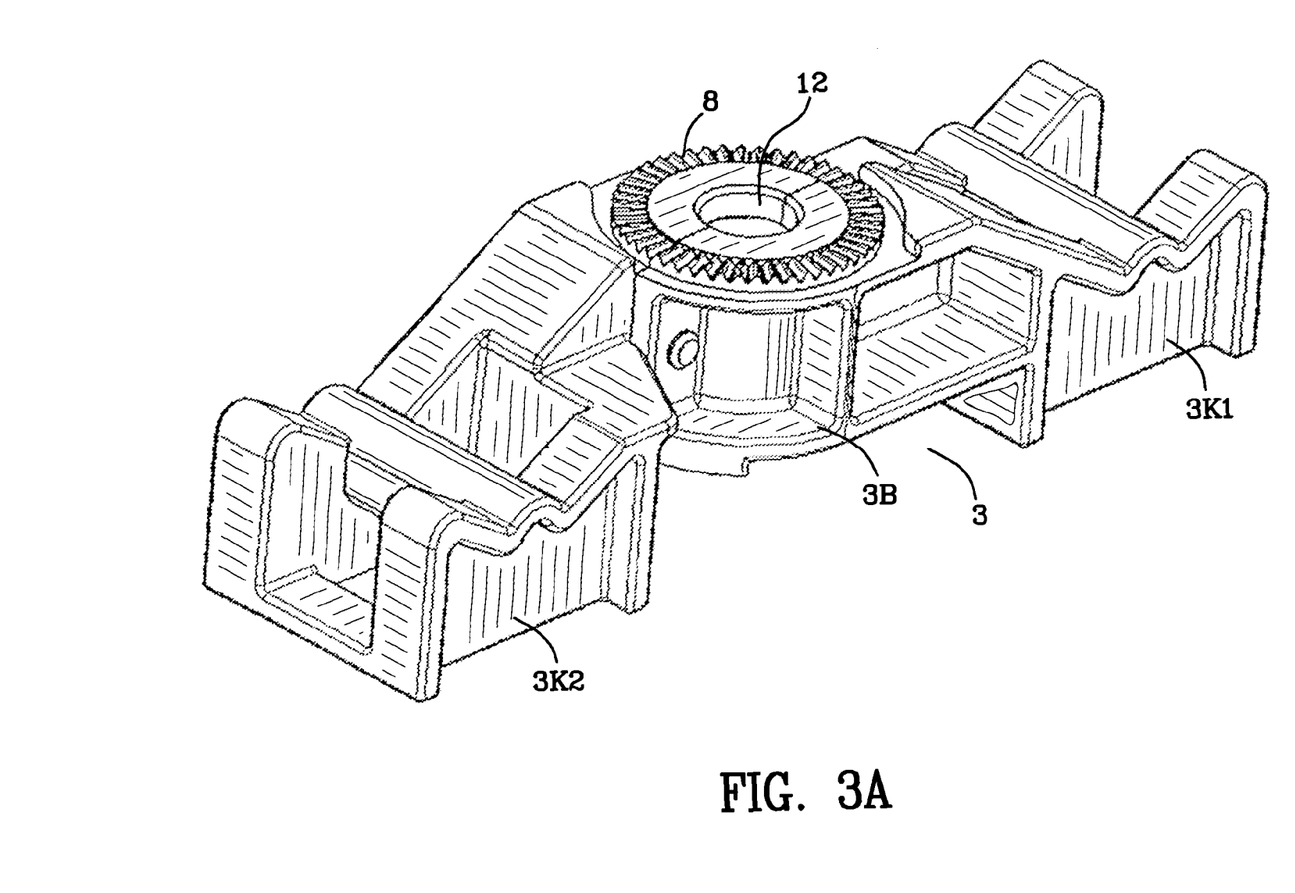
FIG. 3A shows an isometric diagram of a cable-supporting unit with two cable supports viewed towards their upper side.
Figure 3B:
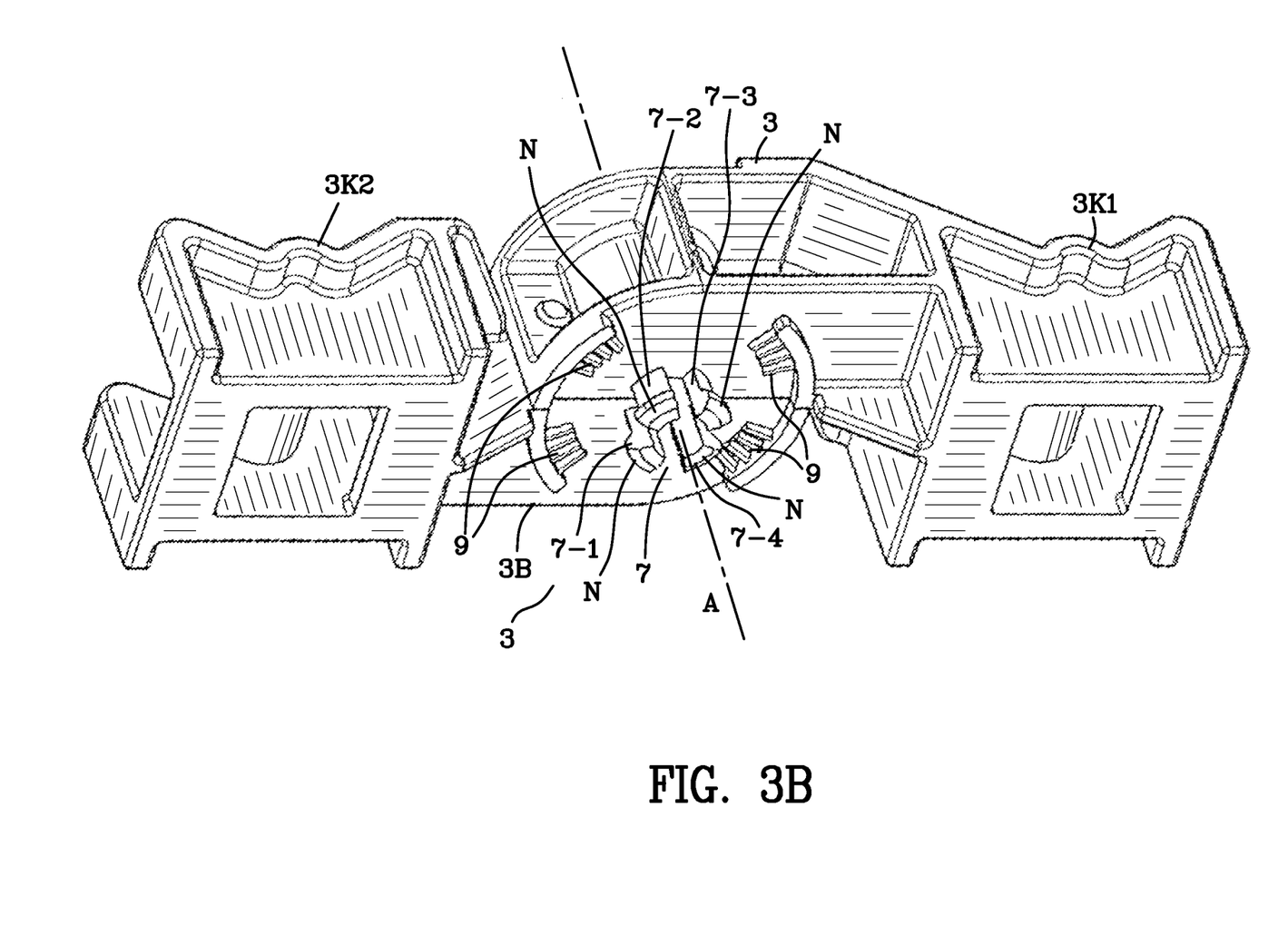
FIG. 3B shows an isometric diagram of a cable-supporting unit in accordance with FIG. 3A, viewed towards its lower side.
Figure 3C:
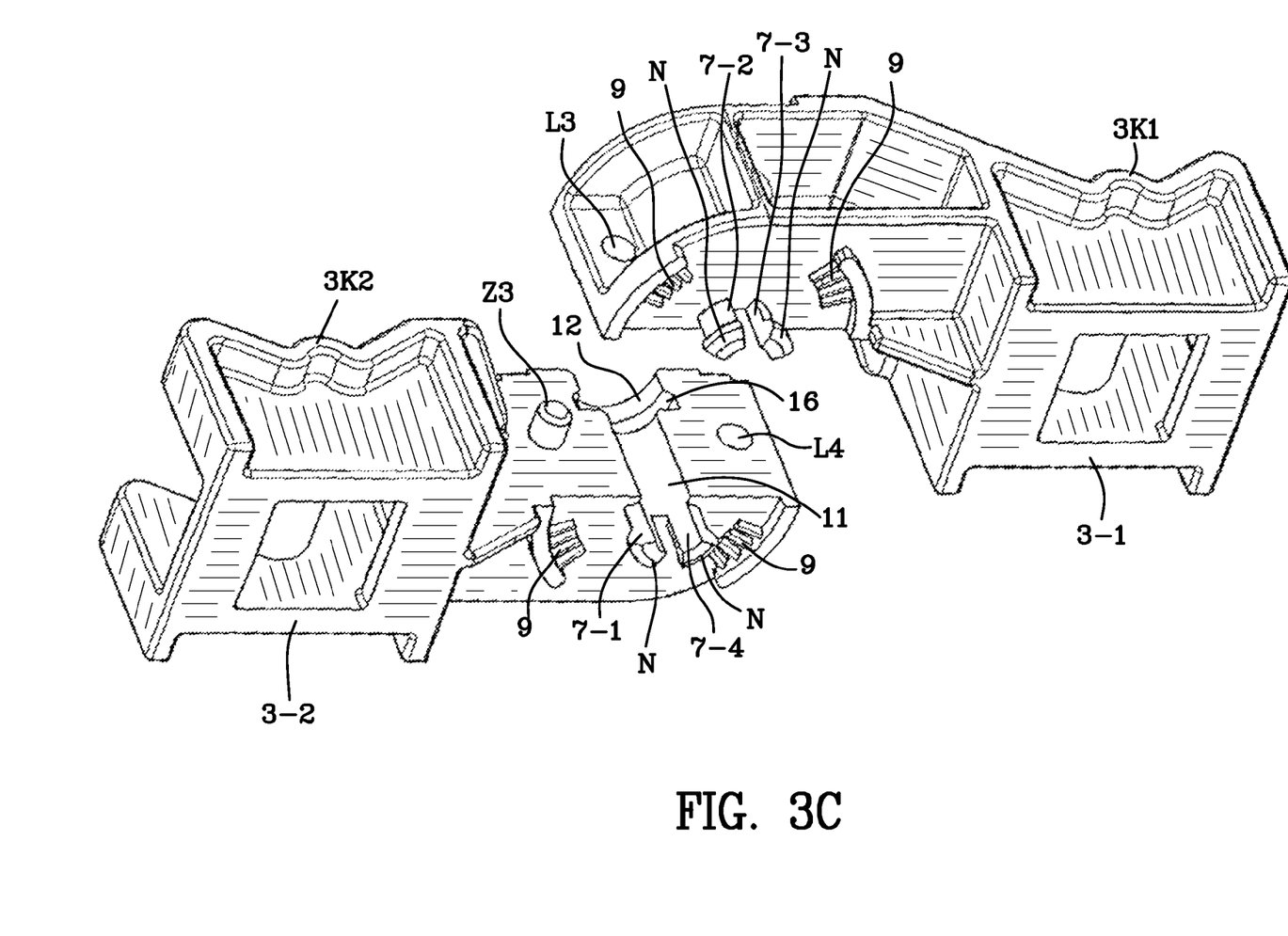
FIG. 3C shows an isometric diagram of the existing cable support unit in accordance with FIG. 3B consisting of two identical halves.
Figure 4:
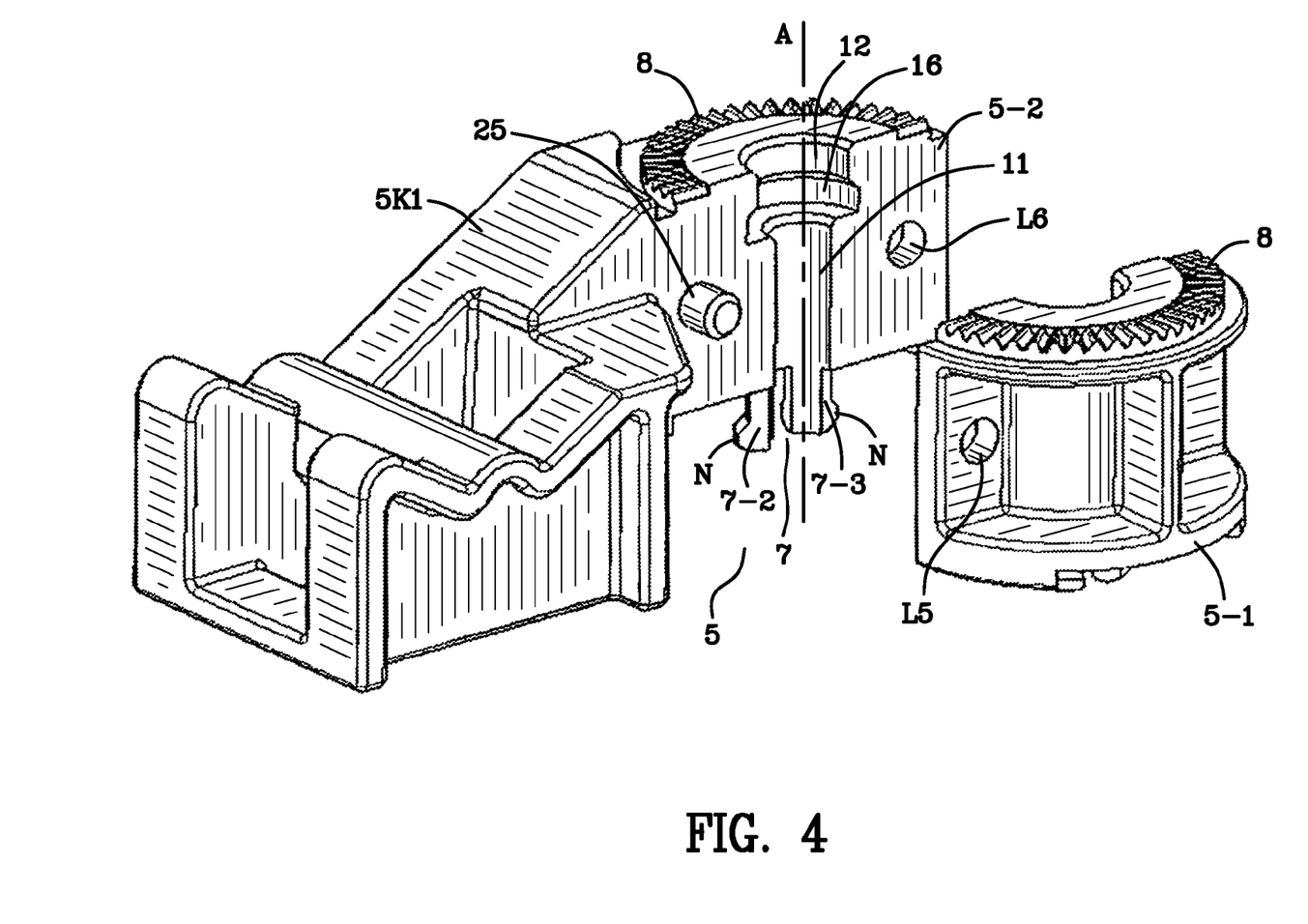
FIG. 4 shows an isometric diagram of a cable-supporting unit with one cable support consisting of two dissimilar parts viewed towards their upper side.
Figure 6:
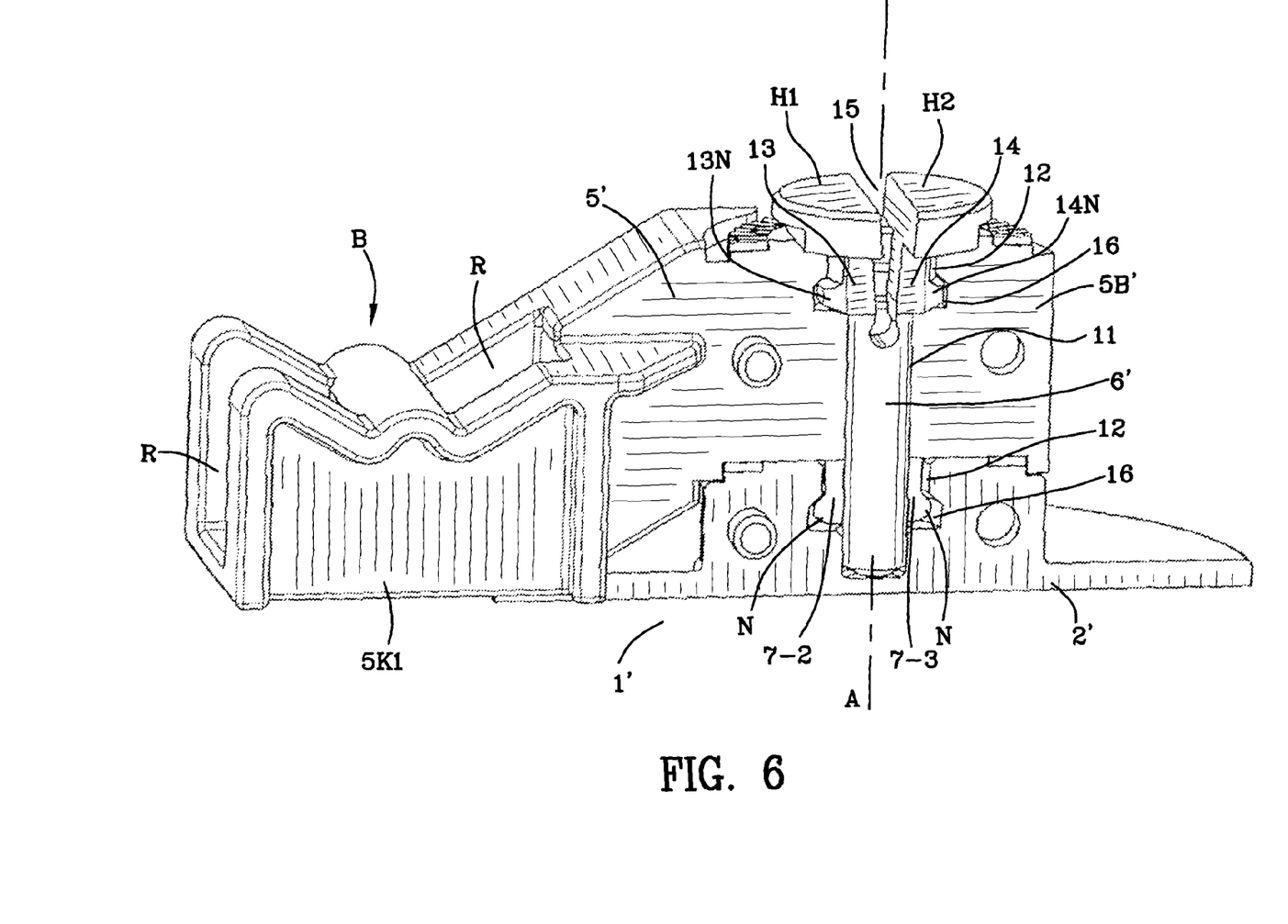
FIG. 6 shows an isometric partial sectional diagram of a cable-support arrangement in accordance with the invention, consisting of a stand part, a cable-supporting unit with one cable support and a securing pin.

All the elements have a bore 11, 11' (FIG. 3c, FIG. 4; FIG. 2B, FIG. 6) with axis A for insertion of a securing pin. The securing pin locks the aforementioned plug-in connections between the stand part 2 and the cable-supporting unit 3, the cable-supporting unit 3 and the spacer 4, and the spacer 4 and the cable-supporting unit 5 into position. In addition, a detachable connection is also provided between the securing pin 6 and the uppermost cable-supporting unit 5 to prevent the securing pin from detaching from the cable-support arrangement.

In their unlocked state, the plug-in connections allow the superimposed elements 2,3,4,5 to be rotated in relation to one another around the axis A. In this way, the elements can be located in the desired engaging position in relation to one another. To this end, locking positions 8 are provided on the upper side of the stand part 2, the cable-supporting units 3 and 5 and the spacer 4, while locking teeth 9 are formed on the lower side of the cable-supporting units 3 and 5 and the spacer 4. The locking elements 9 on the lower side of the upper part engage the locking positions 8 on the upper side of the lower part to achieve the desired rotation-locking position.

In the embodiment of the invention shown in FIG. 1, the locking teeth 9 on the lower side of the cable-supporting unit 3 engage the locking positions 8 on the upper side of the stand part 2, the locking teeth 9 on the lower side of the spacer 4 engage the locking positions 8 on the upper side of the cable-supporting unit 3, and the locking teeth 9 on the lower side of the cable-supporting unit 5 engage the locking positions 8 on the upper side of the spacer 4. The locking positions thus selected are fixed by the securing bolt inserted into the cable-support arrangement when it locks the plug-in connection between the various elements.

Cable-supporting units consist of a base part and at least one cable support permanently joined to the base part. Cable-supporting unit 3 has two cable supports while cable-supporting unit 5 has only one. The base parts of the cable-supporting units and the spacers are preferably of the same design. The ring-shaped locking positions formed towards the edge of the upper side of the base parts, spacers and stand parts allow a greater number of locking positions than is the case with the cable-support arrangement described in European patent EP 1 772 935, B1. In this latter patent, the connection is achieved between the locking elements on the spring arm of a plug-in connector and the locking positions on the inner wall of a recess for receiving the plug-in connector. However, the lack of space in this recess makes it impossible to accommodate as many locking positions as can be formed in a ring towards the edge of the upper side of the base parts, spacers and stand parts.

The cable-support arrangement can be adapted to specific cable layouts by arranging the cable supports at the desired height above the stand part and adjusting their alignment to different rotation-locking positions.

Each base part 3B and 5B of the cable-supporting unit 3 and 5 and the spacer 4 has a plug-in connector 7 on its underside.

This comprises four spring arms 7-1, 7-2, 7-3 and 7-4, at the end of which engaging tappets N are formed (FIG. 3B, FIG. 3C, FIG. 4). The spring arms are arranged concentrically to the bore 11 with axis A, which receives the securing pin. Each base part 3B and 5B of the cable-supporting unit 3 and 5, the spacer 4 and the stand part 2 has a bore-like recess 12 on its upper side to receive a plug-in connector (of a superimposed base part or spacer) (FIG. 3A, FIG. 3C, FIG. 4). This bore-like recess 12 is aligned with the axis A of the bore 11 (or 11' in the stand part 2).

In the inner wall of the recess 12 a concentric locking groove 16 is formed into which the tappets N on the spring arms 7-1, 7-2, 7-3 and 7-4 of a plug-in connector lock when it is inserted into the recess 12. This plug-in connector creates the connection between the stand part 2 and the cable-supporting unit 3, between the cable-supporting unit 3 and the spacer 4, and between the spacer 4 and the cable-supporting unit 5.

This connection can be released (preferably without the use of a tool) by pulling the connected parts apart, as long as the securing pin has not been inserted into the cable-support arrangement.

The bevelled engaging tappet N on a spring arm simply slides over the (preferably) bevelled edge of the locking groove (16) and the plug-in connector 7 can be pulled out of the recess 12.

The inserted securing pin 6 would prevent the plug-in connector from disengaging because it prevents the engaging tappets N on the spring arms from moving back out of the locking groove 16. It therefore locks the connection in place. The cable supports 3K1, 3K2 and 5K1 can be moved into the positions required by the cable layout by turning the cable-supporting units 3 and 5 and the spacer 4 in relation to one another and in relation to the stand part to the correct rotation-locking positions around axis A.

Figure 7:
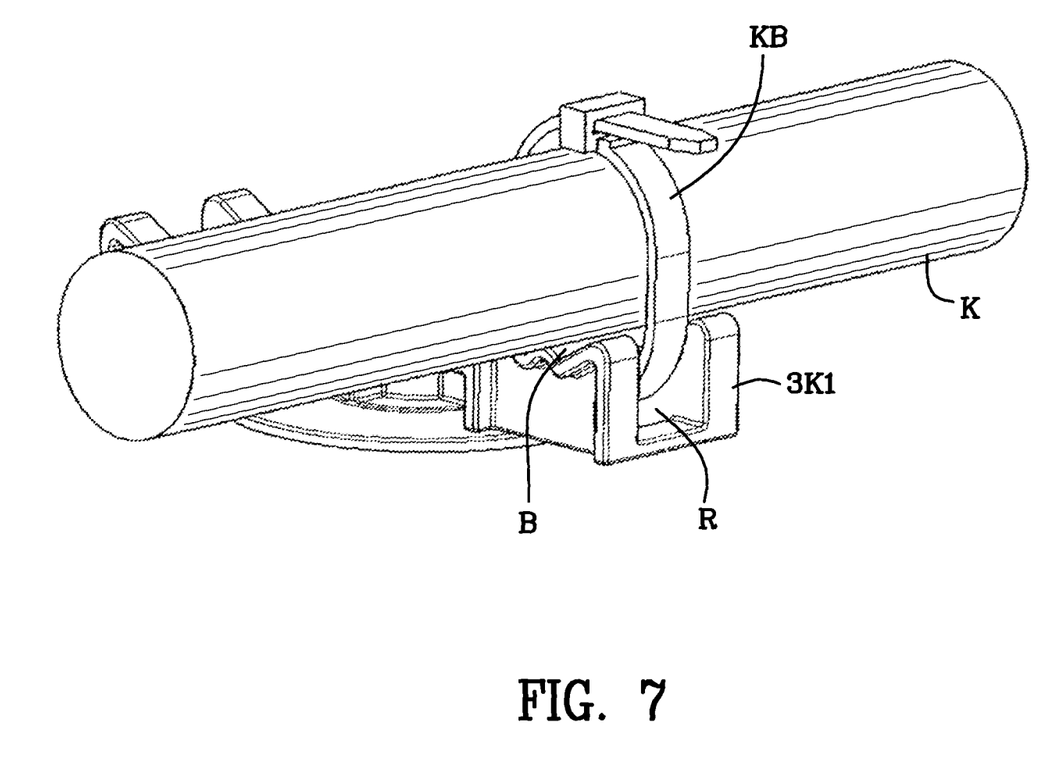
FIG. 7 shows an isometric diagram of a bundle of cables attached to a cable support by means of a cable binder.

The cable supports are intended to aid the support and attachment of cables, e.g. with cable binders (see FIG. 7).

In other embodiments of the invention (not shown), the locking positions can also be formed on the lower side of the base parts and spacers, and the locking elements (at least one locking element) on the upper side of the base parts, spacers and stand part.

It is also possible to depart from the concentric arrangement of the locking positions and locking elements. Any other arrangement is possible which ensures variability of the rotation-locking positions.

Moreover, it is also possible to arrange the plug-in connector on the upper side of the base parts, spacers and stand part, and the recess for receiving such a plug-in connector on the lower side of the base parts and spacers.

Figure 2A:
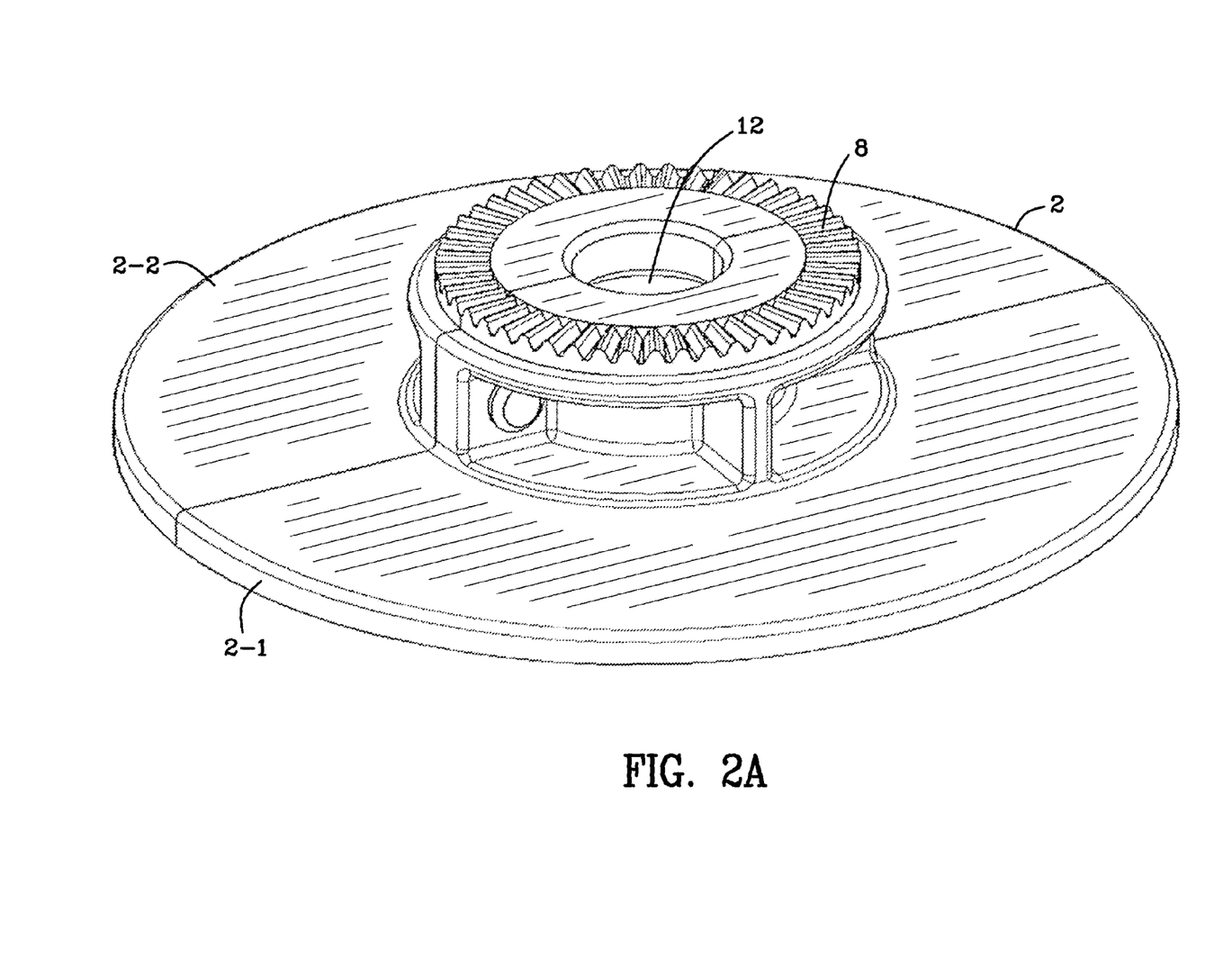
FIG. 2A shows an isometric diagram of the stand part viewed towards its upper side.

FIG. 2A shows an isometric diagram of the stand part 2 viewed towards its upper side. The base plate on the stand part 2 serves to attach it to a floor, wall or ceiling plate, e.g. by bonding riveting etc.

The cable-supporting unit 3 is arranged on (above) the stand part 2 as shown in FIG. 1 and attached to it. In the same way it is also possible to arrange a spacer or another cable-supporting unit on the stand part.

The upper side of the stand part 2 has a bore-like recess 12 for receiving a plug-in connector 7 (e.g. that of the cable-supporting unit 3). On the upper side of the stand part 2 locking positions 8 similar in profile to saw-teeth are formed in a circular ring-like area. The recess 12, the circular ring-like area with the locking positions and the plug-in connector 7 are aligned with the imaginary axis A of the bore 11 or 11', into which the securing pin 6 is inserted.

FIG. 2B shows an isometric diagram of the existing stand part 2 consisting of two identical halves 2-1 and 2-2. Both halves 2-1 and 2-2 can be joined together by peg and hole joints (peg Z1/hole L1; peg of half 2-1, not shown, /hole L2).

The bore-like recess 12 with the locking groove 16 serves to receive the imaginary plug-in connector 7 of another component. The end of the imaginary securing bolt (6) passes through the recess 12 and is guided in the bore 11'. The locking positions are marked as 8. The stand part 2 and the base part can also be formed in one part.

FIG. 3A shows an isometric diagram of a cable-supporting unit 3, in this case with two cable supports 3K1 and 3K2, viewed towards their upper side. The bore-like recess 12 serves to receive the plug-in connector 7 of the spacer 4 arranged above the cable-supporting unit 3 in FIG. 1.

The cable-supporting unit 3 comprises the base part 3B and the cable supports 3K1 and 3K2. The base part and the cable support are joined permanently or designed in one piece.

On the upper side of the base part, locking positions 8 with a profile similar to saw-teeth are formed in a circular area concentric to the imaginary axis A of the bore-like recess 12.

FIG. 3B shows an isometric diagram of a cable-supporting unit 3 in accordance with FIG. 3A, viewed towards its lower side.

The plug-in connector 7 has four spring arms 7-1, 7-2, 7-3, 7-4 which are arranged concentrically around the imaginary axis A. An engaging tappet N is formed at the end of each spring arm.

When the plug-in connector 7 of the cable-supporting unit 3 is inserted into a recess 12 (e.g. in the stand part 2) the engaging tappets enter the concentric locking groove 16 formed in the inner wall of the recess 12.

On the underside of the base part 3B (FIG. 3A, FIG. 3B) locking elements 9 are arranged in groups concentrically around the imaginary axis (A).

The purpose of the locking elements 9 is to engage the locking positions 8 on the upper side (in this case) of the stand part 2 at a certain selected rotation-locking position.

FIG. 3C shows an isometric diagram of the existing cable-supporting unit 3 in accordance with FIG. 3B consisting of two identical halves 3-1 and 3-2. The identical halves 3-1 and 3-2 can be connected by means of peg and hole joints (peg Z3/hole L3; peg of half 3-1, not shown, /hole L4). The spring arms with the engaging tappets N are marked as 7-1, 7-2, 7-3 and 7-4 as in FIG. 3B.

The through bore 11 permits the securing pin 6 to pass through. The bore-like recess for the plug-in connector 7 of the spacer 4 is marked as 12, the locking groove as 16.

This cable-supporting unit could also be designed as one single part.

FIG. 4 shows an isometric diagram of a cable support unit 5 with one cable support 5K1 consisting of two dissimilar parts 5-1 and 5-2 viewed towards their upper side.

The bore-like recess for receiving an imaginary plug-in connector is marked as 12, the locking groove as 16 and the locking positions as 8. The spring arms 7-2 and 7-3 of the plug-in connector 7 with the engaging tappets N are arranged on the lower side of the component 5-2. The remaining spring arms 7-1 and 7-4 on component 5-1 are not shown in this diagram. Both parts 5-1 and 5-2 are connected by means of peg and hole joints (peg Z5/L5; peg of part 5-1, not shown, /hole L6).

The bore 11 serves to guide the securing pin 6.

Figure 5:
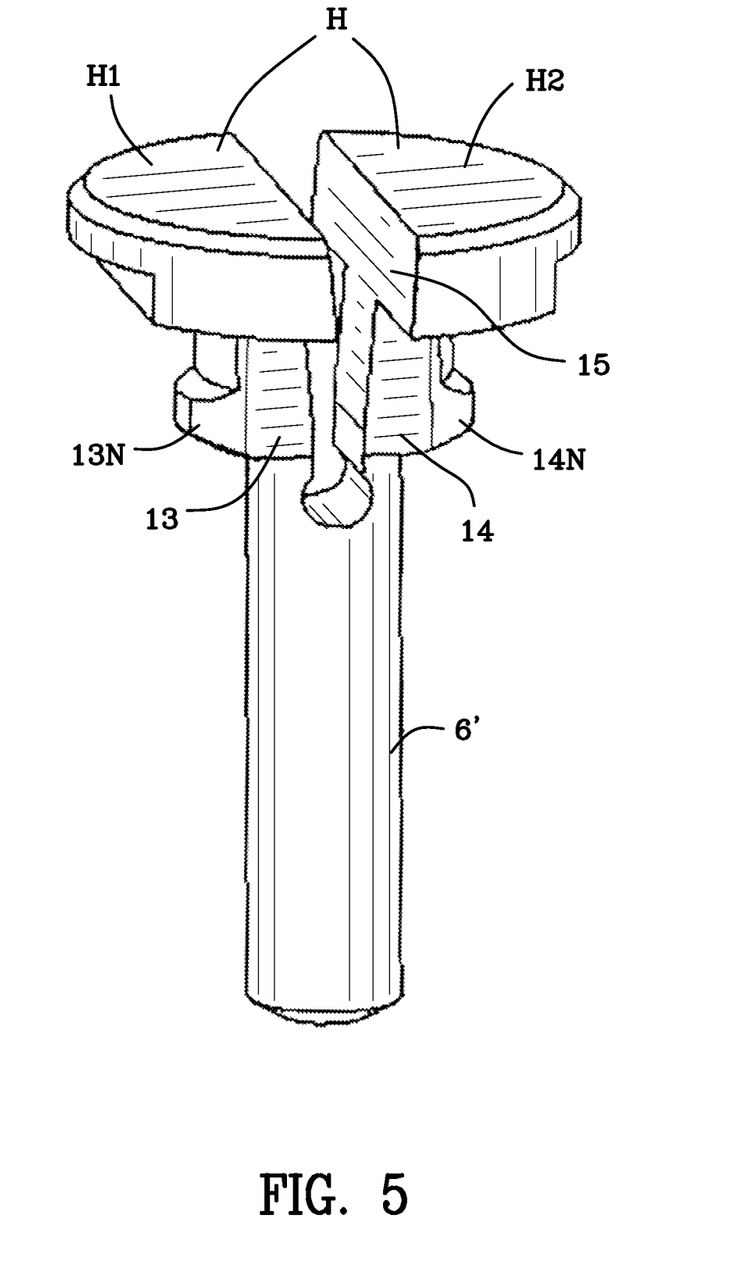
FIG. 5 shows an isometric diagram of the securing pin.

FIG. 5 shows an isometric diagram of the securing pin 6' to fit the cable-support arrangement shown in FIG. 6. The head H of this pin and the area of the securing pin in the vicinity of the head are divided in the lengthwise direction by a gap 15. The lengthwise parts of the pin 13 and 14 separated by gap 15 form spring arms on which the engaging tappets 13N and 14N are formed. The engaging tappets engage the locking groove 16 of the bore-like recess 12 when the securing pin is fully inserted into the cable-support arrangement 1' and the bolt head contacts the uppermost cable support 5'. In this position, it is not possible for the securing pin to become detached from the cable-support arrangement.

To detach the securing pin 6', the two parts of the head H1 and H2 are pressed together against the spring force of the lengthwise parts of the pin 13 and 14. The engaging tappets 13N and 14N are then forced out of the locking groove 16 (assuming that the gap is wide enough) thereby allowing the securing pin to be pulled out of the bore 11 and 11' of the cable-support arrangement 1'.

Since the securing pin must vary in length according to the height of the cable-support arrangement, it is expedient to use a securing pin of maximum length with pre-determined breaking points S (FIG. 1). These allow the pin to be shortened manually in length in order to adapt it to the height of the cable-support arrangement in question, i.e. for a lesser number of cable-supporting units and spacers.

FIG. 6 shows an isometric partial sectional diagram of a cable-support arrangement 1' in accordance with the invention. It comprises a stand part 2', a cable-supporting unit 5' consisting of the base part 5B' with the cable support 5K1' and the securing pin 6'.

The cable support has a bed B for supporting cables etc. which are held together by a cable binder (see FIG. 7) or similar device and fixed to the cable support.

The cable binder passes through recesses R in the cable support to prevent the cables from becoming detached from the support.

The securing pin 6' locks the plug-in connection between the stand part 2' and the cable-supporting unit 5' by preventing the engaging tappets N of the spring arms (only two of these, 7-2 and 7-3 are visible in FIG. 6) of the plug-in connector from releasing from the locking groove 16 of the bore-like recess 12 in the stand part 2'.

In addition, the position of the securing pin in the cable-support arrangement 1' is secured by the fact that the engaging tappets 13N and 14N on the resilient lengthwise parts 13 and 14 of the pin engage the locking groove 16 in the recess 12 of the cable-supporting unit 5'.

FIG. 7 shows an isometric diagram of a bundle of cables K attached to a cable support 3K1 by means of a cable binder KB. The bundle K of cables etc. is located in the bed B of the cable support 3K1 and is fixed in position there, e.g. by a cable binder KB or similar device. The cable binder KB is pushed through recesses R provided in the cable support for this purpose. Thus, a cable K held by the cable support cannot become detached from it.

In its most general form, the cable-support arrangement in accordance with the invention is characterised by the following features:

The cable-support arrangement 1, 1' comprises at least one cable-supporting unit 3, 5, 5' consisting of a base part 3B, 5B, 5B' and at least one cable support 3K1, 3K2, 5K1, 5K1' permanently attached to this base part, a stand part 2, optional spacers 4 and a securing pin 6, 6' common to the base part, the stand part and the spacer.

On the base part 2, cable-supporting units 3, 5, 5' and spacers 4 can be superimposed on one another in any desired order.

The stand part 2 can be connected permanently to a floor, wall, ceiling or similar plate element.

The base part 3B, 5B, 5B' of the cable-supporting unit 3, 5, 5' and the spacers 4 have an upper and a lower side and a through bore 11.

The stand part 2 has an upper side and a bore 11'. The through bores of all the base parts and spacers and the bore in the stand part are aligned with one another with reference to a common imaginary axis A for receiving the securing pin 6, 6'.

The securing pin 6, 6' can be inserted into the bore 11, 11' from the upper free end of the cable-support arrangement facing away from the stand part 2.

The stand part 2 can be connected to a base part 3B of a directly superimposed cable-supporting unit 3 or a directly superimposed spacer by means of a lockable and detachable plug-in connector 7.

A base part of a cable-supporting unit or a spacer can be connected to a directly superimposed base part of a cable-supporting unit, or a directly superimposed spacer by means of a lockable and detachable plug-in connector 7 to form a plug-in connection, where superimposed base parts or spacers in the unlocked position can be rotated with reference to one another around the axis A.

Axis (A)-related rotating and locking positions 8 or at least one locking element are formed on the upper side of a stand part, a base part and a spacer.

At least one locking element 9 or axis-related rotation-locking position is formed on the underside of a base part and a spacer, where with the directly superimposed parts, i.e. stand part and base part, stand part and spacer, base part and base part, base part and spacer, spacer and base part, and spacer and spacer, the locking elements on the lower side of the upper part engage the locking positions on the upper side of the lower part by turning superimposed parts around the axis A in order to achieve a desired rotation-locking position, and where the locking elements on the upper side of the lower part engage with the locking positions on the lower side of the upper part by turning superimposed parts around the axis A in order to achieve a desired rotation-locking position.

A detachable pin connection 13N/16, 14N/16 is provided between the securing pin 6, 6' and the topmost base part 5B at the free end of the cable-support arrangement 1 facing away from the stand part 2.

By means of the securing pin 6, 6' which can be inserted into the cable-support arrangement, the connection with the plug-in connector can be locked into place, thereby achieving the pin connection.

The plug-in connection known in the art comprises a plug-in connector 7 with at least one spring arm 7-1, 7-2, 7-3, 7-4 with an engaging tappet N and an engaging groove 16 running concentrically in the inner wall of a plug-connection bore 12, where the spring arm 7-1, 7-2, 7-3, 7-4 is insertable into the bore 12 to achieve the engagement of the engaging tappet N in the engaging groove 16. The plug-connection bore 12 and the bore 11, 11' for receiving the securing pin 6, 6' have the same imaginary axis A.

The securing pin 6' has a head H. This head and the area of the securing pin in the vicinity of the head are divided in lengthwise direction by a gap 15, where the lengthwise parts of the pin 13, 14 separated by the gap form spring arms on which engaging tappets 13N, 14N are formed. In the base part 5B' a concentrically running engaging groove 16 is provided in the inner wall of a bore 12 with axis A, to permit engagement of the engaging tappets 13N, 14N of the spring arms 13, 14 when the securing pin 6' is inserted into the bore 12 of the upper base part of the cable-support arrangement up to the stop limit for the head H.

The pin connection 13N/16, 14N/16 is detached from the uppermost base part by pressing the two parts of the pin head H1, H2 together in such a way that the engaging tappets 13N, 14N are released from the engaging groove 16 and the securing pin 6' is pulled out of the bore 11, 12.

The securing pin 6 has pre-determined breaking points S for shortening it to fit the height of the cable-support arrangement 1.

The stand part 2, the cable-supporting unit 3 and the spacer 4 are formed in one part or can be assembled from two identical halves 2-1, 2-2; 3-1, 3-2. The cable-supporting unit 5 can also be assembled from two dissimilar parts 5-1, 5-2.

The identical halves or the dissimilar parts can be assembled by means of hole and peg joints.

The base part 3B, 5B of a cable-supporting unit 3, 5 and the spacer 4 are preferably of the same design.

The cable-support arrangement is made of plastic, preferably of polyetherimid.

The invention claimed is:

1. A cable-support (1, 1') in combination with cable-supporting units (3, 5, 5'), comprising:
   each of said cable-supporting units (3, 5, 5') includes a base part (3B, 5B, 5B') and at least one cable support (3K1, 3K2, 5K1, 5K1');
   each of said base parts (3B, 5B, 5B') of cable-supporting units (3, 5, 5') includes an upper side, a lower side and a bore (11);
   a stand part (2), said stand part includes a bore (11') and an upper side;
   a spacer (4), said spacer includes a bore, an upper side and a lower side;
   a securing pin (6, 6');
   each of said bores (11) of said base parts (3B, 5B, 5B'), said bore of said spacer, and said bore (11') of said stand part (2) are aligned with each other for receiving said securing pin (6, 6');
   said securing pin resides within said bore (11') of said stand part, said bore of said spacer and said bores (11) of said base parts of said cable-supporting units;
   one of said base parts is an upper-most base part of one of said cable-supporting units being an upper-most cable-supporting unit, said securing pin (6, 6') insertable into said bore (11) of said upper-most base part of said upper-most cable-supporting units, said securing pin (6, 6') insertable into said bore of said spacer, said securing pin (6, 6') insertable into said bore (11') of said stand part (2), and said securing pin (6, 6') insertable from said upper side of said upper-most base part of said upper-most cable-supporting unit facing away from said stand part (2);
   said cable-supporting units (3, 5, 5') and spacer (4) can be arranged in any order with respect to each other, said cable supporting units (3, 5, 5') supported by said base parts (3B, 5B, 5B');
   said stand part (2) connected to a floor, wall, or ceiling;
   said cable-supporting units arranged in different rotary positions with respect to said axis;
   said cable supporting units (3, 5, 5') include a lockable and detachable plug-in connector (7);
   said spacer (4) includes a lockable and detachable plug-in connector (7);
   said stand part (2) connected: to said base part (3B) of said cable-supporting unit (3); or, to said spacer (4) by means of said lockable and detachable plug-in connector (7) to form a plug-in connection;
   one of said base parts of said cable-supporting unit (5) connected to said base part of said cable-supporting unit (3); or to spacer (4) by means of said lockable and detachable plug-in connector (7) to form a plug-in connection;
   said upper side of said stand part includes locking teeth (8);
   said upper side of each of said base parts includes locking teeth (8);
   said upper side of said spacer includes locking teeth (9);
   said lower side of each of said base parts includes locking teeth (9);
   said lower side of said spacer includes a locking teeth (9);
   said locking teeth (9) of said lower side of an upper part engages said locking teeth (8) of said upper side of an adjacent lower part, said position of said upper part with respect to said adjacent lower part is rotatably adjustable by turning said parts relative to each other about said axis;
   a detachable pin connection (13N/16, 14N/16), said detachable pin connection resides between said securing pin (6, 6') and said upper side of said base part (5B); and,
   said securing pin (6, 6') resides within said bore (11') of said stand part, said bore of said spacer and said bores (11) of said base parts of said cable-supporting units and actuates said plug-in connector (7) in said stand part (2).

2. The cable-support (1, 1') in combination with cable-supporting units (3, 5, 5') as claimed in claim 1, further comprising:
   said plug-in connector (7) of said plug-in connection includes at least one spring arm (7-1, 7-2, 7-3, 7-4) and an engaging tappet (N);
   said stand part includes a connection bore (12) and an engaging groove (16) running concentrically in said connection bore (12);
   said spring arm (7-1, 7-2, 7-3, 7-4) is insertable into said bore (12) for engagement of said engaging tappet (N) with said engaging groove (16) of said connection bore (12).

3. The cable-support (1, 1') in combination with cable-supporting units (3, 5, 5') as claimed in claim 1, further comprising:
   said securing pin (6') includes a head (H);
   said head (H) and said securing pin in proximity to said head are divided in a lengthwise direction by a gap (15);

said securing pin includes lengthwise parts (13, 14) separated by said gap (15) which form spring arms on which engaging tappets (13N, 14N) are formed;

said base part (5B') includes an engaging groove (16) in said bore, said engaging groove being concentric with respect to said axis permitting engagement of said engaging tappets (13N, 14N) of said spring arms (13, 14) when said securing pin (6') is inserted into said bore (12) of said upper base part of said cable-support.

4. The cable-support (1, 1') in combination with cable-supporting units (3, 5, 5') as claimed in claim 3, further comprising:

said head of said pin connection (13N/16, 14N/16) includes two parts (H1, H2);

said pin connection is detached from said uppermost base part by pressing said two parts of said pin head (H1, H2) together in such a way that the engaging tappets (13N, 14N) are released from said engaging groove (16) and said securing pin (6') is removed from said bore (11, 12).

5. The cable-support (1, 1') in combination with cable-supporting units (3, 5, 5') as claimed in claim 1, further comprising:

said securing pin (6) has breaking points (S) for shortening said securing pin to fit the height of the cable-support arrangement (1).

6. The cable-support (1, 1') in combination with cable-supporting units (3, 5, 5') as claimed in claim 1, further comprising:

cable supports (3K1, 3K2, 5K1, 5K1') fixed to a base part (3B, 5B, 5B') include a bed (B) for holding cables and through holes (R) to allow cable binders to pass therethrough.

7. The cable-support (1, 1') in combination with cable-supporting units (3, 5, 5') as claimed in claim 1, further comprising:

said stand part (2), said cable-supporting unit (3) and said spacer (4) are formed in one part.

8. The cable-support (1, 1') in combination with cable-supporting units (3, 5, 5') as claimed in claim 1, further comprising:

said stand part (2), said cable-supporting unit (3) and said spacer (4) are formed in one part.

9. The cable-support (1, 1') in combination with cable-supporting units (3, 5, 5') as claimed in claim 1, further comprising:

said stand part (2) comprises two identical halves (2-1, 2-2; 3-1, 3-2).

10. The cable-support (1, 1') in combination with cable-supporting units (3, 5, 5') as claimed in claim 1, further comprising:

said cable-supporting unit (5) can be assembled from two dissimilar parts (5-1, 5-2).

11. The cable-support (1, 1') in combination with cable-supporting units (3, 5, 5') as claimed in claim 10, further comprising:

said dissimilar parts can be joined together by peg and hole joints.

12. The cable-support (1, 1') in combination with cable-supporting units (3, 5, 5') as claimed in claim 1, further comprising:

said base part (3B, 5B) of said cable-supporting unit (3, 5) and said spacer (4) are identical in form.

13. The able-support (1, 1') in combination with cable-supporting units (3, 5, 5') as claimed in claim 1, further comprising:

said cable-support is made of plastic.

14. The cable-support (1, 1') in combination with cable-supporting units (3, 5, 5') as claimed in claim 1, further comprising:

said cable support is made of polyetherimid.

* * * * *